United States Patent [19]

Shimizu et al.

[11] Patent Number: 5,171,377
[45] Date of Patent: Dec. 15, 1992

[54] BRAZING FLUX

[75] Inventors: Fumio Shimizu; Fusayoshi Miura; Kenichi Suzuki; Yoshihiro Kinoshita, all of Aichi, Japan

[73] Assignees: Kabushiki Kaisha Toyota Chuo Kenkyusho, Aichi; Nippondenso Co., Ltd., Kariya, both of Japan

[21] Appl. No.: 620,028

[22] Filed: Nov. 30, 1990

[30] Foreign Application Priority Data

Dec. 1, 1989 [JP] Japan .................. 1-313992
Sep. 25, 1990 [JP] Japan .................. 2-255760

[51] Int. Cl.$^5$ ............................ B23K 35/34
[52] U.S. Cl. .................................... 148/23
[58] Field of Search ............................ 148/26

[56] References Cited

U.S. PATENT DOCUMENTS

| | | | |
|---|---|---|---|
| 3,951,328 | 4/1976 | Wallace | 148/26 |
| 4,619,716 | 10/1986 | Suzuki | 148/26 |
| 4,670,067 | 6/1987 | Suzuki | 148/26 |
| 4,689,092 | 8/1987 | Suzuki | 148/26 |
| 4,888,067 | 12/1989 | Sato | 148/26 |
| 4,906,307 | 3/1990 | Fujiyoshi | 148/26 |
| 4,923,530 | 5/1990 | Miki | 148/26 |

FOREIGN PATENT DOCUMENTS

| | | |
|---|---|---|
| 60-61195 | 4/1985 | Japan . |
| 184490 | 9/1985 | Japan . |
| 232092 | 7/1986 | Japan . |
| 162295 | 8/1986 | Japan . |
| 284496 | 6/1989 | Japan . |
| 1375999 | 12/1974 | United Kingdom . |

Primary Examiner—Peter D. Rosenberg
Attorney, Agent, or Firm—Oblon, Spivak, McClelland, Maier & Neustadt

[57] ABSTRACT

A brazing flux comprises cesium fluoride, aluminum fluoride, and crystalline aluminum hydroxide or aluminum oxide or both which form a crystalline compound having the following composition and containing cesium in the form of a complex salt:

$$x \cdot CsF - y \cdot AlF_3 - \tfrac{1}{2} \cdot z \cdot [Al_2O_3 \cdot nH_2O \text{ and/or } Al_2O_3]$$

where $x+y+z=100$, $x/y \leq 3$, $42 \leq x \leq 66$, and $z \geq 2$ in terms of mol %. The crystalline compound has a melting point of 440° to 580° C.

The brazing flux is non-corrosive and safe to use, and well suited for a brazing aluminum materials with a high magnesium content and also for torch brazing.

15 Claims, 5 Drawing Sheets

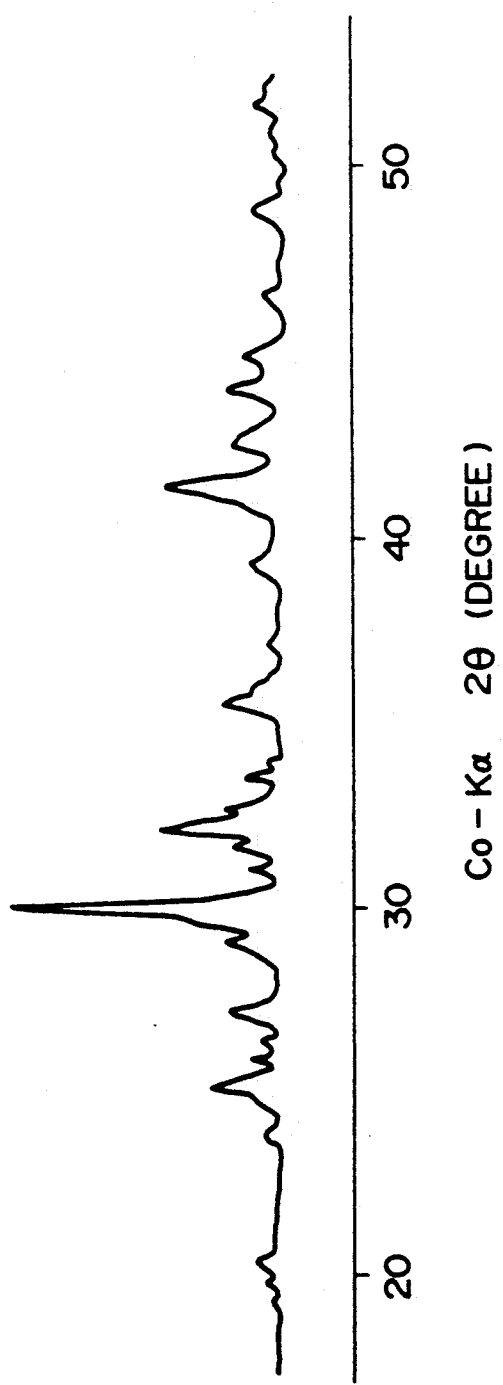

BRAZING FLUX

BACKGROUND OF THE INVENTION

1. Field of the Invention

The present invention relates to a flux used for brazing aluminum and an aluminum alloy (both referred to as an aluminum material hereinafter). More particularly, the present invention relates to a flux used for brazing an aluminum material with a high magnesium content, said flux being a complex compound containing cesium (Cs) as a complex salt and crystalline aluminum hydroxide and/or aluminum oxide.

2. Description of the Related Art

The brazing of an aluminum material is conventionally accomplished with an aluminum-silicon eutectic alloy as a brazing filler metal, which has a slightly lower melting point than has the aluminum material. To achieve the good joining of the parts of an aluminum material, the brazing filler metal is applied to the joint together with a flux which cleans the aluminum material of surface oxide films and other contaminants. One of the new fluxes is a noncorrosive flux which is a KF-AlF$_3$ complex (potassium fluoroaluminate). A disadvantage of this flux is that it melts at a eutectic point of KF-AlF$_3$ which is 560° C., and hence it should be used with a brazing filler metal having a melting point higher than 560° C. by tens of degrees. The brazing filler metal and flux having such a high melting point necessitate the brazing temperature to be high and present difficulties in controlling the brazing temperature, particularly in the case where heating is by manual brazing torches (acetylene flame). In other words, brazing with the KF-AlF$_3$ flux needs a great deal of skill. Another disadvantage of this flux is that it is not very effective in the brazing of a magnesium-containing aluminum material. It is said that this flux cannot be used for the brazing of an aluminum material containing more than 0.4 wt % of magnesium.

To eliminate the disadvantages involved in the related art technology, there has been proposed a brazing flux which is composed of 100 wt % of potassium fluoroaluminate (or potassium fluoroaluminate and aluminum fluoride) and 5-15 wt % of aluminum ammonium fluoride, said potassium fluoroaluminate containing 60-50 wt % of aluminum fluoride and 40-50 wt % of potassium fluoride. It is said that this brazing flux can be applied to an aluminum material containing magnesium up to about 2 wt %. (See Japanese Patent Laid-open No. 184490/1985.) This brazing flux still suffers from a disadvantage or having a melting point as high as 569°-580° C. and giving off a large amount of harmful fumes of ammonium fluoride (NH$_4$F) during brazing. The harmful fumes present a serious problem associated with safety and pollution.

To eliminate the disadvantages involved in the related art technology, the present inventors proposed a brazing flux which is cesium fluoroaluminate containing aluminum fluoride and cesium fluoride in a molar ratio of from 67:33 to 26:74, or is a mixture composed of said cesium fluoroaluminate and aluminum fluoride. (See U.S. Pat. No. 4,689,092.) This brazing flux is of practical use because it melts at a lower temperature (440°-460° C.) than KF-ALF$_3$ flux by about 120° C. In addition, it can be applied to a magnesium-containing aluminum material. However, although it is superior to the KF-ALF$_3$ flux when applied to an aluminum material with a high magnesium content, it does not fully exhibit its performance if the magnesium content exceeds 1 wt %.

The above-mentioned fluxes easily oxidize and deteriorate unless they are used under strictly controlled conditions; in other words, they are not well suited for torch brazing. (Note that the one disclosed in Japanese Patent Laid-open No. 184490/1985 has a melting point in a narrow range of 569°-580°C. and the one disclosed in U.S. Pat. No. 4,689,092 has a melting point in a narrow range of 440°-460° C.)

The problems in the related art technology have also been approached with another brazing flux for an aluminum material and a process for its production. (See U.S. Pat. No. 4,923,530). This flux is produced with an amorphous aluminum hydroxide and has a composition of M$_x$AlF$_y$O$_z$ (where x = 0.5-2.0, y = 1.5-4.8, z = 0.1-1.0, and M denotes Li, Na, K, Rb, or Cs). This flux has good stability in suspension in addition to a low melting point like the flux disclosed in U.S. Pat. No. 4,689,092. Further, this flux is easy to produce and economically advantageous. However, with M being cesium, this flux has a melting point in a narrow range of 410°-440°C. Therefore, it easily oxidizes and deteriorates unless it is used under strictly controlled conditions; in other words, it is not well suited for torch brazing.

The present inventors have proposed a non-corrosive brazing flux of CsF-AlF$_3$-KF, which has a controlled melting point within a broad range of 440°-580° C. and can be effectively applied to a magnesium-containing aluminum material. (See U.S. Pat. No. 4,670,067.) A disadvantage of this flux is that it contains K and active F which form high-melting fluorides such as KMgF$_3$ and MgF$_2$ to reduce the flowability of the brazing filler metal. Therefore, it is not well suited for the brazing of an aluminum material containing more than 1 wt % of magnesium. This is true particularly in the case where it is applied to the atmospheric torch brazing of a magnesium-rich aluminum material. In this case it reduces the flowability of the brazing filler metal and prevents it from completely running between the objects to be joined.

In order to solve the above-mentioned problems involved in the related art technology, the present inventors carried out a series of researches, which led to the present invention.

SUMMARY OF THE INVENTION

It is an object of the present invention to provide a non-corrosive brazing flux which is safe to use, has a low melting point, and suits the brazing of a magnesium-rich aluminum material by torch brazing.

The present inventors approached the problems involved in the related art technology in the following way. It is considered that safety, which is one of the objects of the present invention, will not be achieved with the above-mentioned conventional flux containing aluminum ammonium fluoride, which has a high melting point and gives off harmful ammonium fluoride (NH$_4$F) fumes during brazing. It is further considered that the above-mentioned conventional flux of a CsF-AlF$_3$ type which is safe to use should be improved so that it hardly oxidizes and deteriorates and enables uniform good brazing for an aluminum material with a high magnesium content. After careful consideration, the present inventors devised a new flux containing a substance which expands the range of melting temperatures and suppresses the formation of MgF$_2$ which lowers the flowability of the brazing filler metal when it is applied to an aluminum material with a high magnesium content. (The range of melting temperature means a difference between a temperature at which the flux begins to melt and another temperature at which the flux entirely becomes a liquid. The broader the range of melting temperature, the better the resistance to oxidative deterioration.) The new flux developed on the basis of this idea is composed of $CsF\text{-}AlF_3$ and crystalline $Al_2O_3 \cdot nH_2O$ and/or $Al_2O_3$. This new flux have solved the problems involved in the related art technology.

The brazing flux of the present invention comprises cesium fluoride, aluminum fluoride, and crystalline aluminum hydroxide or aluminum oxide or both which form a composition represented by

where $x+y+z=100$, $x/y \leq 3$, $42 \leq x \leq 66$, and $z \geq 2$ (in terms of mol %), said components forming a crystalline compound which has a melting point in the range of 440°–580° C. at which cesium is present in the form of complex salt. This flux is well suited for the brazing of an aluminum material with a high magnesium content.

The brazing flux of the present invention is noncorrosive and is well suited for the brazing of an aluminum material with a high magnesium content and also for torch brazing. It is quite safe to use and has a low melting point and melts over a broad range of temperature.

The brazing flux of the present invention has the following features. It melts over a broad range of temperatures from 440° C. to 580° C. At a temperature from 440° C. to 580° C., it removes oxide films and other contaminants from the brazing part of a magnesium-rich aluminum material, thereby improving the flowability of the brazing filler metal and hence permitting the brazing filler metal to run uniformly to give a good brazed joint. Owing to its melting point over a broad range from 440° C. to 580° C., it is less liable to degradation and deterioration during torch brazing in the atmosphere, and hence it is well suited for the brazing of a magnesium-rich aluminum material. In addition, it does not give off harmful fumes of ammonium fluoride in the course of brazing, and hence it is safe to use. It has a low melting point. After brazing, it does not leave any residue which corrodes the aluminum material and brazing filler metal.

Although no elucidation has been made yet as to the mechanism which permits the brazing flux of the present invention to exhibit the above-mentioned effects, the following is speculated. Since the brazing flux of the present invention contains crystalline aluminum hydroxide and/or aluminum oxide, it contains fluorine in a lower ratio than the conventional flux composed entirely of fluorides. Therefore, it has a lower fluorine activity, which leads to a decrease in the amount of $MgF_2$ formed during the brazing temperature rise. ($MgF_2$ prevents the brazing filler metal from flowing.) This may be the reason why the brazing flux of the present invention permits uniform good brazing for an aluminum material with a high magnesium content.

A fluoride is considered to be an indispensable constituent of a flux for brazing an aluminum material, because, when a flux melts, fluorine becomes active and removes oxide films (which prevent the brazing filler metal from flowing) from the surface of the parts of aluminum material to be joined. However, the amount of fluorine in a flux should be properly controlled, because, when a flux is applied to a magnesium-containing aluminum material, fluorine in the fluoride reacts with highly active magnesium to form a high-melting $MgF_2$, which degrades and deteriorates the flux. The conventional flux composed entirely of fluorides contains fluorine more than necessary and hence becomes degraded and deteriorated and decreases in activity and gives off a large amount of harmful ammonium fluoride ($NH_4F$) fumes in the course of brazing. The fume evolution presents a serious safety problem. By contrast, the brazing flux of the present invention, which contains crystalline aluminum hydroxide and/or aluminum oxide as mentioned above, has a lower ratio of fluorine and hence a lower activity of fluorine; therefore, it permits the adequate flowability of the brazing filler metal.

The brazing flux of the present invention is of ternary type represented by $CsF\text{-}AlF_3\text{-}[Al_2O_3 \cdot nH_2O$ and/or $Al_2O_3]$. Consequently, it begins to melt at about 440° C. and entirely changes from a solid into a liquid at about 580° C. In other words, it has a broader melt temperature range compared with the conventional flux of binary type ($CsF\text{-}AlF_3$) or of quaternary type made of amorphous aluminum hydroxide and having a melt composition of $M_xAlF_yO_z$ (where $x=0.5\text{-}2.0$, $y=1.5\text{-}4.8$, $z=0.1\text{-}1.0$, and M denotes Li, Na, K, Rb, or Cs) and having a melting point of 410°–440° C. The broader melt temperature range means that the flux is less liable to degradation and decrease in activity that take place in the course of heating for brazing. Thus the brazing flux of the present invention has several features which are summarized below. It melts over a broad temperature range from 440° C. to 580° C. It permits the brazing filler metal to completely wet an aluminum material with a high magnesium content. It removes oxide films and other contaminants from the parts to be joined and also from the brazing filler metal, and hence it permits good uniform brazing. It is well suited for the brazing of magnesium-rich aluminum material by torch brazing in the atmosphere which is liable to oxidize and degrade the flux. It does not give off a large amount of fumes in the course of brazing, unlike the conventional flux containing $(NH_4)_3AlF_6$; therefore, it is safe to use and poses no pollution problems. It does not corrode the aluminum material (to be treated) and brazing filler metal because it merely leaves a water-insoluble residue. It has a lower melting point than has the conventional $KF\text{-}AlF_3$ flux; therefore, it permits the brazing process to be performed at a lower temperature and hence easily. It permits the brazing of low-melting aluminum materials (such as the aluminum alloy casting), which was impossible with the conventional $KF\text{-}AlF_3$ flux. It is less expensive than the $CsF\text{-}AlF_3$ binary flux because it contains a less amount of expensive fluorine.

BRIEF DESCRIPTION OF THE DRAWINGS

FIG. 7 is an X-ray diffraction pattern of the flux obtained in Example 2.

DETAILED DESCRIPTION OF THE INVENTION

Figure 1:
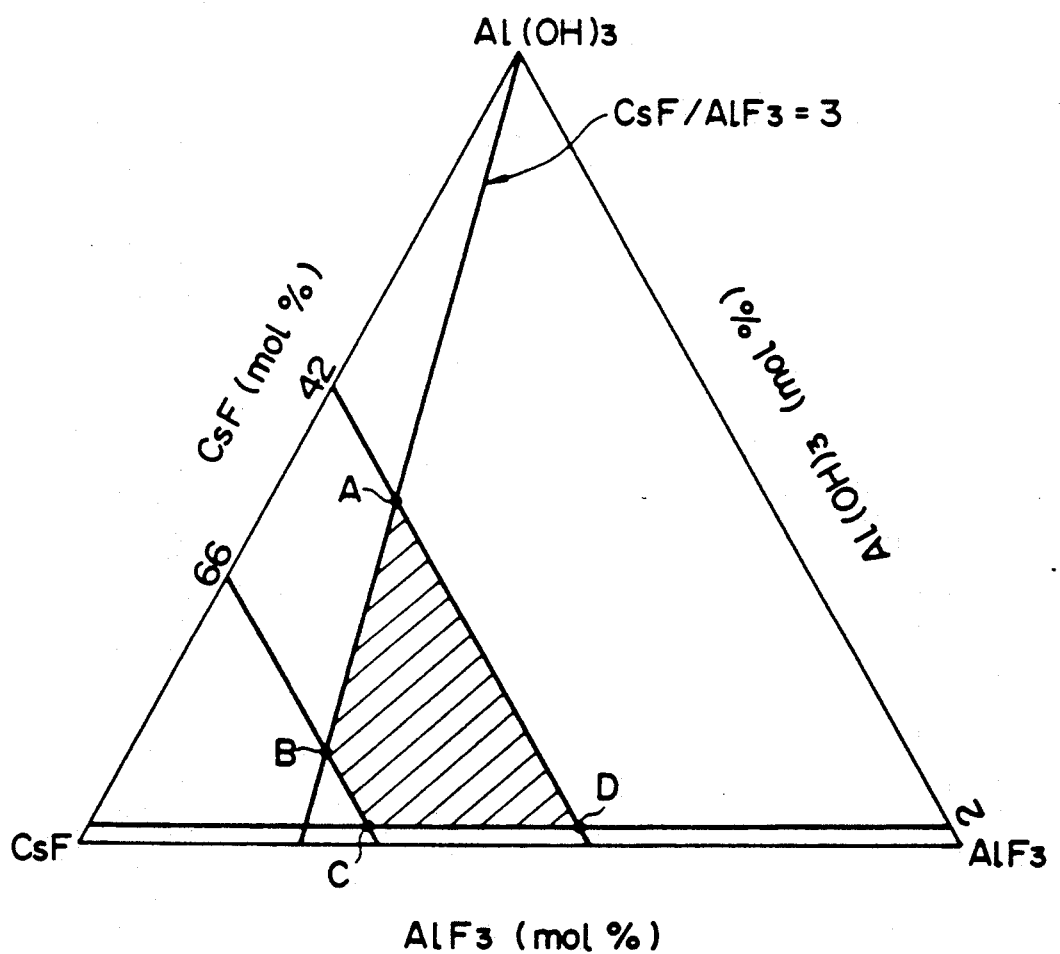
FIG. 1 is a diagram showing the composition of the brazing flux according to the present invention.

The brazing flux of the present invention comprises cesium fluoride, aluminum fluoride, and crystalline aluminum hydroxide or aluminum oxide or both as above mentioned.

This brazing flux may comprise
a complex compound composed of cesium (Cs) in the form of a complex salt, aluminum (Al), and fluorine (F), or a mixture composed of said complex compound and aluminum fluoride ($AlF_3$), and
crystalline aluminum hydroxide [$Al_2O_3 \cdot nH_2O$] and/or aluminum oxide [$Al_2O_3$].

The complex compound includes cesium salts of fluoroaluminic acid, such as cesium hexafluoroaluminate ($Cs_3AlF_6$), cesium tetrafluoroaluminate ($CsAlF_4 \cdot 2H_2O$), and cesium pentafluoroaluminate ($Cs_2AlF_5 \cdot H_2O$). It also includes cesium salts of fluoroaluminic acid, with the fluorine atoms partly replaced by OH groups, such as $Cs_xAl_y(F, OH)_z \cdot nH_2O$ (where x, y, z, and n each denote an integer, and $x + 3y = z$). The complex compound may vary in composition, and the complex compound may also vary in morphology depending on temperature even through it has the same composition. The complex compound is not specifically limited in structure and morphology so long as it has the composition of $x \cdot CsF - y \cdot AlF_3$ in the above-mentioned molar ratio.

The crystalline aluminum hydroxide is hydrated aluminum oxide or water-containing aluminum oxide represented by $Al_2O_3 nH_2O$. It includes a compound represented by $Al(OH)_3$ as well as boehmite and diaspore represented by $Al_2O_3 \cdot 3H_2O$ (where $n = 1$) and gibbsite and bayerite represented by $Al_2O_3 \cdot 3H_2O$ (where $n = 3$) or $Al(OH)_3$. These compounds yield aluminum oxide containing a different amount of water upon dehydration at a proper temperature for a proper period of time. The thus obtained aluminum hydroxide can be used for the raw material of the brazing flux of the present invention.

The crystalline aluminum oxide ($Al_2O_3$) is a dehydration product of the above-mentioned aluminum hydroxide ($Al_2O_3 \cdot nH_2O$). It varies in crystal structure depending on the hydrated state it has before dehydration and the heating temperature. It includes, for example, $\gamma$-alumina (activated alumina) and $\alpha$-alumina. The one which has been completely changed into $\alpha$-alumina is not preferable, because it increases the melting point of the flux, aggravating the brazability, when incorporated in a large amount into the cesium fluoroaluminate pertaining to the present invention. In other words, $\alpha$-alumina should not be present as such in large amount in the flux, but it should be incorporated into the flux after it has been reacted or fused with other components of the flux and then crushed into powder.

The crystalline aluminum hydroxide ($Al_2O_3 \cdot nH_2O$) or aluminum oxide ($Al_2O_3$) or a mixture thereof which is incorporated into the brazing flux of the present invention has the following features. Therefore, it is a desirable additive for the brazing flux which achieves the object of the present invention.

It readily dissolves in the molten flux salt.
It is so stable that it does not react with components in the brazing filler metal and the materials to be joined.
It expands the difference between the temperature at which the flux begins to melt and the temperature at which the flux entirely liquefies.
It suppresses the formation of $MgF_2$ and/or it causes $MgF_2$ to fuse.
It is only slightly soluble in water.
It has no adverse effect on the durability of the brazed aluminum material. It is not replaced by any substance harmful to the durability of the brazed aluminum material.

According to the present invention, the crystalline aluminum hydroxide ($Al_2O_3 \cdot nH_2O$) and aluminum oxide ($Al_3O_3$) should preferably have a particle diameter smaller than 10 $\mu m$, so that the flux readily melts.

According to the present invention, the brazing flux should be composed of the compounds whose mol % is shown by Gibbs' triangular coordinate in FIG. 1. The composition is within the hatched area surrounded by lines AB, BC, CD, and DA in FIG. 1. The composition specified by the hatched area is necessary for the brazing flux to melt or begin to melt at 440°-580° C. and to be useful as a non-corrosive brazing flux. Incidentally, $Al(OH)_3$ is assumed for the crystalline aluminum hydroxide.

According to the present invention, the content of cesium fluoride (CsF) should be from 42 mol % to 66 mol %; otherwise, the brazing flux does not melt completely and hence results in incomplete brazing due to poor flowability. The content of crystalline aluminum hydroxide and/or aluminum oxide should be more than 2 mol %; otherwise, the brazing flux is poor in brazing performance when applied to a magnesium-containing aluminum material. The molar ratio (x/y) of cesium fluoride and aluminum fluoride should be smaller than 3; otherwise, the brazing flux would corrode the aluminum material because it contains free cesium fluoride which is not fixed in the form of complex salt and the complex compound containing free cesium fluoride is hygroscopic.

According to the present invention, the brazing flux should preferably be composed of 5-22 mol % of crystalline $Al(OH)_3$, 48-58 mol % of CsF, and 20-47 mol % of $AlF_3$. The brazing flux of this composition is well suited for the brazing of aluminum materials with a high magnesium content and also for torch brazing in the atmosphere.

According to the present invention, it is important for the brazing flux that the composition be within the above-specified range and the complex compound contain no free cesium fluoride.

The brazing flux of the present invention may be produced by any one of the following processes.

(1) A process consisting of the steps of preparing cesium fluoroaluminate and mixing it with crystalline aluminum hydroxide and/or aluminum oxide according to the above-mentioned composition.
(2) A process consisting of the steps of mixing CsF, $AlF_3$, and crystalline aluminum hydroxide and/or aluminum oxide (in powder form) in a prescribed ratio, melting the mixture in a crucible, and crushing the solidified mixture after cooling. In this process, it is desirable to add $AlF_3$ in a small excess to compensate its loss due to sublimation that takes place during melting. In the case where $\alpha$-alumina is used as the crystalline aluminum oxide, the melting temperature would be higher than in the case where other activated alumina or aluminum hydroxide is used.

(3) A process consisting of the steps of mixing aluminum fluoride (especially $AlF_3 \cdot 3H_2O$), cesium fluoride (CsF), and crystalline aluminum hydroxide and/or aluminum oxide (in powder form) in a prescribed ratio, adding water to the mixture to make a paste or slurry, and ageing the paste or slurry at room temperature for a long period of time or with heating up to 100° C. for about 1 hour. In this process, aluminum fluoride, which is barely soluble in water, slowly reacts with soluble CsF to form cesium fluoroaluminate. This process gives rise to cesium fluoroaluminate of desired composition or a mixture composed of cesium fluoroaluminate, aluminum fluoride, and crystalline aluminum hydroxide and/or aluminum oxide.

(4) A process consisting of the steps of dissolving crystalline aluminum hydroxide and/or aluminum oxide or crystalline metallic aluminum in either an aqueous solution of hydrofluoric acid or an aqueous solution of cesium hydroxide (CsOH), and neutralizing the resulting solution with either of the aqueous solutions which remains unused, thereby precipitating a substance composed of crystalline aluminum hydroxide and/or aluminum oxide and a compound containing a complex salt of cesium fluoroaluminate.

(5) A process consisting of the steps of mixing crystalline aluminum hydroxide and/or aluminum oxide with an aqueous solution of hydrofluoric acid and cesium hydroxide and/or cesium carbonate ($Cs_2CO_3$), thereby causing Al, Cs, and F to react with one another by stirring to form a substance composed of crystalline aluminum hydroxide and/or aluminum oxide and a compound containing a complex salt of cesium fluoroaluminate. This process may give rise to a flux slurry which contains carbon dioxide gas dissolved therein; but it causes no troubles because it evaporates during brazing.

The above-mentioned third to fifth processes give rise to an aqueous solution containing cesium fluoroaluminate and crystalline aluminum hydroxide and/or aluminum oxide, which can be used as such for brazing. It is also possible to filter the precipitates in the aqueous solution and dry them at a temperature lower than their melting point, so that the resulting powder is used as the brazing flux.

The raw materials used for the brazing flux may contain impurities in such an amount which has no adverse effect on the brazing performance. For example, the raw material may contain alkali metals and alkaline earth metals in an amount up to several mol %. However, it is important that no free cesium fluoride be formed in the flux under any manufacturing conditions.

The brazing flux of the present invention can be used for the brazing of aluminum materials by any conventional method as briefly explained in the following. First, the brazing flux is applied, together with a brazing filler metal, to the parts of aluminum material to be joined. The flux may be applied in the form of paste, slurry, or suspension in water after the flux powder is dispersed in water or alcohol, and the application of the flux may be accomplished by brushing, spraying, or dipping. The particle size of the flux should preferably be less than 20 to 30 μm, so that it can be applied easily.

The brazing filler metal should preferably have a melting point which is equal to or 10°-100° C. higher than the temperature at which the flux begins to melt. Since the flux of the present invention begins to melt at about 440°-480° C., the brazing filler metal may be selected from Al-Si eutectic alloys (such as A4343 alloy and A4047 alloy, containing 7-12 wt % of Si), low-melting Al-Si-Cu alloys (such as A4145 alloy, which begin to melt at about 521° C.), low-melting Al-Si-Cu-Zn alloys (which begin to melt at about 516° C.), low-melting Al-Zn-Si alloys (which begin to melt at about 470° C.), and low-melting Al-Zn alloys (which begin to melt at about 382° C.). Therefore, the brazing flux of the present invention permits the brazing of Al alloy castings which has been impossible with the conventional $KF-AlF_3$ flux.

Secondly, the parts to be joined are heated. Heating may be accomplished with a torch or in a furnace. Furnace heating may be carried out in the atmosphere, but it should preferably be carried out in a non-oxidizing gas such as nitrogen. On heating, the flux melts first to remove oxide films and other contaminants from the surface of the aluminum material. This function is remarkable in the case of an aluminum material containing magnesium. The molten flux does not react with aluminum. As the temperature rises further, the brazing filler metal melts to wet the cleaned surface of the aluminum material and runs between the parts to be joined. Finally, the parts to be joined are removed from the furnace and allowed to cool. When the brazing filler metal solidifies, a good joint is completed.

The brazing flux of the present invention may also be effectively used for torch brazing without deterioration by oxidation because it melts over a broad range of temperature from 440° C. to 580° C. (Torch brazing, which is usually carried out in the atmosphere, changes the composition of the flux due to oxidative deterioration and hence lowers the activity of the flux. This is remarkable in the case where the flux has a low melting point and melts in a narrow temperature range.)

The brazing flux of the present invention may be applied not only to the joining of aluminum materials to each other but also to the joining of an aluminum material to other metallic material such as iron, titanium, and nickel.

EXAMPLES

The invention will be described in more detail with reference to the following examples.

EXAMPLE 1

Five samples of the brazing flux of the present invention were prepared in the following manner. First, a mixture was prepared from CsF, $AlF_3 \cdot 3H_2O$, and crystalline $Al(OH)_3$ (gibbsite) in the mixing ratio shown in Table 1. Second, 10 g of water was added to 100 g of each mixture to make a paste. After thorough mixing, the paste was heated at 80° C. for 1 hour to give a dry solid product. Finally, the solid product was crushed into powder (Sample Nos. 1-5).

Figure 2:
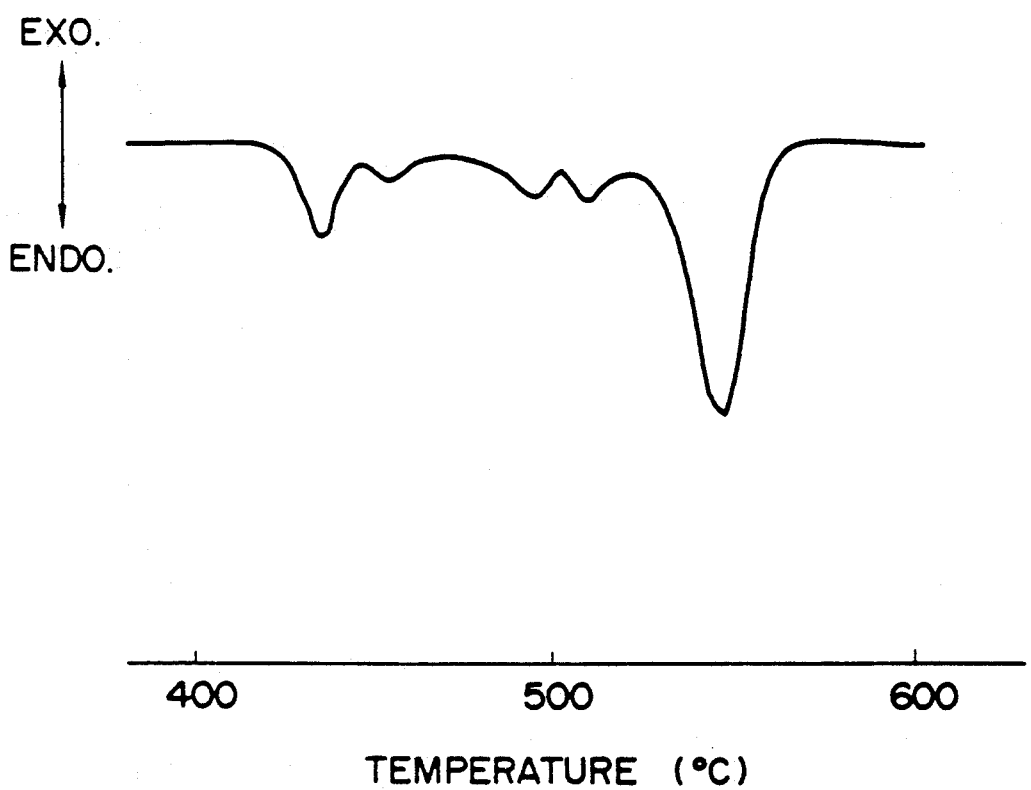
FIG. 2 is a DTA curve of the flux obtained in Example 1.
Figure 3:
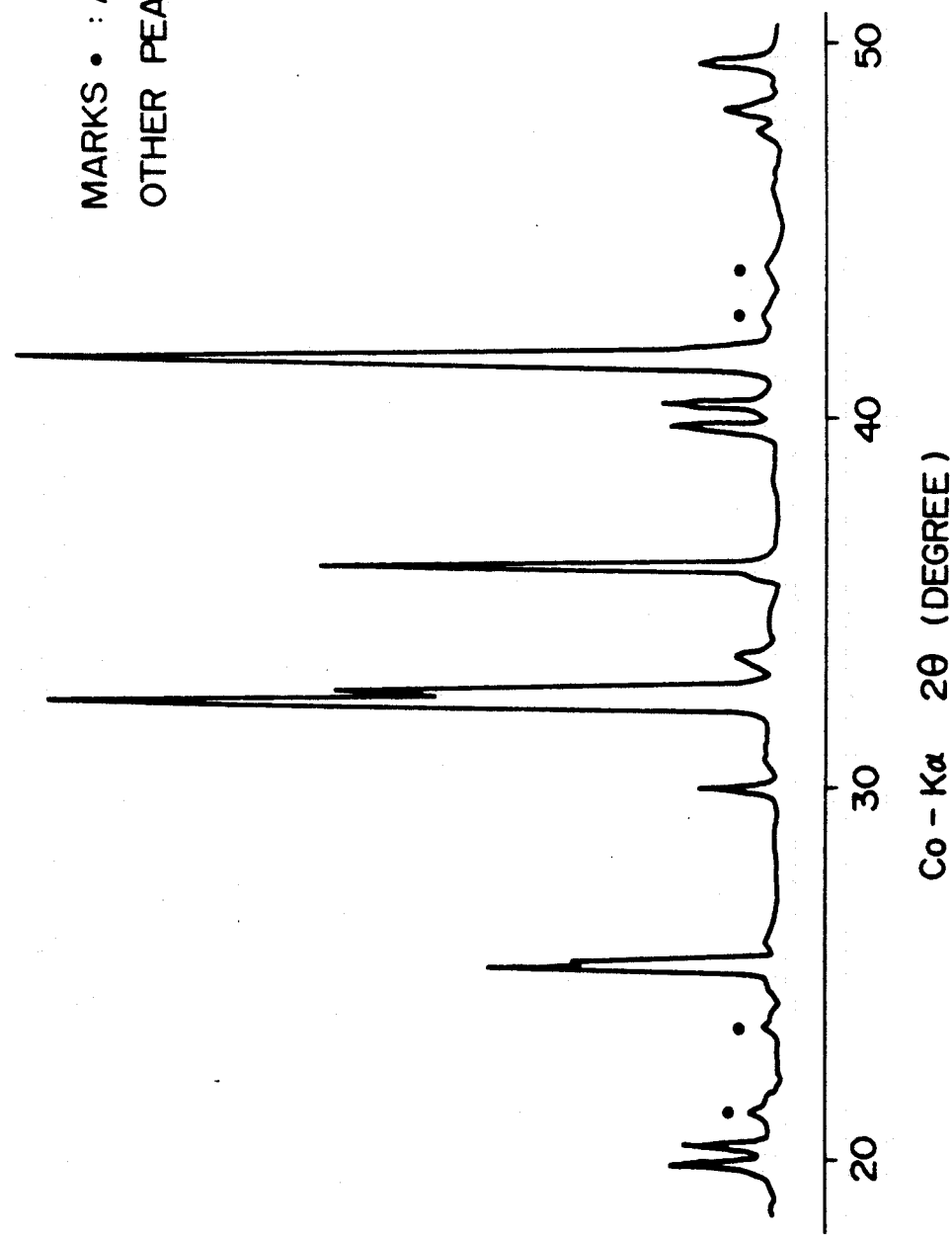
FIG. 3 is an X-ray diffraction pattern of the flux obtained in Example 1.

The thus obtained flux samples underwent differential thermal analysis (DTA) and X-ray diffractometry. The resulting DTA curves indicate that the flux samples in this example melt or begin to melt at temperatures in the range of 440° C. to 580° C. Also, the resulting X-ray diffraction patterns indicate that the flux samples in this example contain a complex salt but do not contain free CsF. None of the flux samples is hygroscopic. FIGS. 2 and 3 show respectively the DTA curve and X-ray diffraction pattern of sample No. 5.

The brazing flux obtained in this example was tested for brazing performance in the following manner. First, two pieces of aluminum material to be joined were assembled in the form of inverted T after degreasing with trichloroethylene. The first piece is an aluminum plate, 3 cm square and 1 mm thick, containing about 1.2 wt % of magnesium (Japanese Industrial Standard A3004), and the second piece is a brazing sheet, 3 cm square and 1.6 mm thick, clad with an Al-Si(7 wt %) alloy (JIS BA12PC). For the application of the flux, the assembly for brazing was dipped in an aqueous suspension containing 20 wt % of the flux, followed by drying, so that the flux adhered to the assembly. For brazing, the assembly was heated in a furnace under a nitrogen stream for 2 minutes at a temperature shown in Table 2. The result of brazing (the spread of the brazing filler metal) was visually inspected. The results are shown in Table 2. In Table 2, the brazability is ranked as "S", "A", "B", and "C" based on the following criteria.

S: The brazing gave a fillet of uniform width.
A: The brazing gave a fillet of uniform width, although the brazing filler metal ran slightly slow.
B: The brazing filler metal ran unevenly.
C: The brazing filler metal hardly ran.

Figure 4:
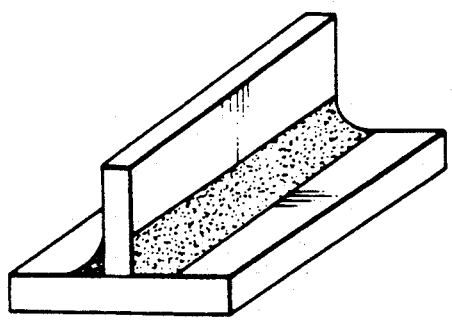
FIG. 4 is a schematic perspective view showing the fillet of brazed joint obtained in Example 1.

The brazing with the flux of this example gave a fillet of uniform width at the joint as shown in FIG. 4. In addition, after brazing, very little residue was noticed on the surface of the basis metal.

Figure 5:
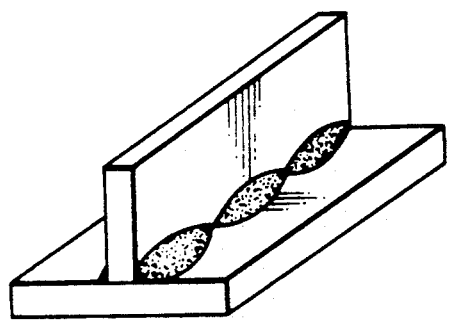
FIGS. 5 and 6 are schematic perspective views showing the fillets of brazed joints obtained with a comparative flux.
Figure 6:
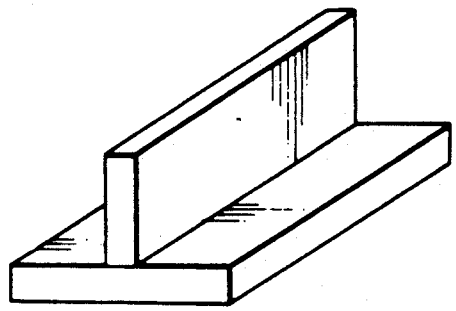

For comparison, comparative flux samples (Nos. C1 to C5) were prepared according to the composition shown in Table 1. They were tested for hygroscopic properties and brazing performance in the same manner as mentioned above. The results are shown in Table 2. It is noted from Table 2 that the comparative flux samples are poor in brazing performance, with the brazing filler metal running unevenly as shown in FIG. 5. The comparative flux sample No. C4 is especially poor in brazing performance, with the brazing filler metal running very little as shown in FIG. 6. In addition, the comparative flux sample No. C4 is hygroscopic.

TABLE 1

| Sample No. | Composition (mol %) | | | |
| --- | --- | --- | --- | --- |
| | CsF | ALF$_3$.3H$_2$O | AL(OH)$_3$ | CsF/ALF$_3$ |
| 1 | 42 | 14 | 44 | 3.0 |
| 2 | 66 | 22 | 12 | 3.0 |
| 3 | 66 | 32 | 2 | 2.1 |
| 4 | 42 | 56 | 2 | 0.75 |
| 5 | 55 | 25 | 20 | 2.2 |
| C1 | 55 | 45 | 0 | 1.2 |
| C2 | 55 | 44 | 1 | 1.2 |
| C3 | 67 | 25 | 8 | 2.7 |
| C4 | 50 | 15 | 35 | 3.3 |
| C5 | 40 | 25 | 35 | 1.6 |

TABLE 2

| Sample No. | Hygroscopicity of flux | Heating temperature for brazing | Spreadability of brazing filler metal | Brazing performance of flux |
| --- | --- | --- | --- | --- |
| 1 | none | 610° C. | good | A |
| 2 | none | 610° C. | good | A |
| 3 | none | 610° C. | good | A |
| 4 | none | 610° C. | good | A |
| 5 | none | 610° C. | excellent | S |
| C1 | none | 610° C. | poor | B |
| C2 | none | 610° C. | poor | B |
| C3 | none | 610° C. | poor | B |
| C4 | yes | 610° C. | poor | C |
| C5 | none | 610° C. | poor | B |

EXAMPLE 2

Four samples of the brazing flux of the present invention were prepared in the following manner. First, a mixture was prepared from CsF, AlF$_3$, and crystalline Al(OH)$_3$ bayerite (for sample Nos. 6 to 8) or α-Al$_2$O$_3$ (for sample No. 9) in the mixing ratio shown in Table 3. Second, the powder mixture was melted in a crucible under a nitrogen stream. After cooling, the solidified product was crushed into powder finer than 200 mesh.

The thus obtained flux samples underwent differential thermal analysis (DTA) and X-ray diffractometry in the same manner as in Example 1. The resulting DTA curves indicate that the flux samples in this example melt or begin to melt at temperatures in the range of 440° C. to 580° C. Also, the resulting X-ray diffraction patterns indicate that the flux samples in this example contain a complex salt but do not contain free CsF. FIG. 7 shows the X-ray diffraction pattern of sample No. 9.

The brazing flux obtained in this example was tested for brazing performance (ability to spread the brazing filler metal) in the following manner. First, the flux powder was mixed with water to give a slurry. Then, the slurry was applied using a brush to the center of an aluminum plate containing 1.2 wt % of magnesium, measuring 2 by 3 cm and 1 mm thick (JIS A3004). On the center of the aluminum plate was placed a piece of brazing filler metal in wire form, 2 mm in diameter and 5 mm long (JIS A4047). The brazing filler metal was heated with an oxygen-acetylene torch burner in the atmosphere at temperatures shown in Table 4. The brazing filler metal was examined for spreadability. The results are shown in Table 4. All of the flux samples spread evenly. Sample Nos. 6, 7, and 9 were especially superior in ability to spread the brazing filler metal.

The test piece on which the brazing filler metal had spread was immersed in deionized water at 50° C. for 2 weeks. No sign of corrosion was noticed.

For comparison, a comparative flux sample (No. C6) was prepared according to the composition shown in Table 3 (which does not conform to the present invention). It was tested for hygroscopic properties and brazing performance (ability to spread the brazing filler metal) in the same manner as mentioned above. The results are shown in Table 4. It is noted from Table 4 that the comparative flux sample is poor in brazing performance and is hygroscopic.

TABLE 3

| Sample No. | Composition (mol %) | | | |
| --- | --- | --- | --- | --- |
| | CsF | ALF$_3$.3H$_2$O | AL(OH)$_3$ or ⅓.AL(OH)$_3$ | CsF/ALF$_3$ |
| 6 | 55 | 40 | 5 | 1.4 |
| 7 | 50 | 35 | 15 | 1.4 |
| 8 | 45 | 20 | 35 | 2.3 |
| 9 | 55 | 25 | 20 | 2.2 |
| C6 | 55 | 15 | 30 | 3.7 |

TABLE 4

| Sample No. | Hygroscopicity of flux | Heating temperature for brazing | Spreadability of brazing filler metal |
| --- | --- | --- | --- |
| 6 | none | 620° C. | excellent |
| 7 | none | 620° C. | excellent |
| 8 | none | 620° C. | good |
| 9 | none | 620° C. | excellent |

TABLE 4-continued

| Sample No. | Hygroscopicity of flux | Heating temperature for brazing | Spreadability of brazing filler metal |
| --- | --- | --- | --- |
| C6 | yes | 620° C. | poor |

EXAMPLE 3

A sample (No. 10) of the brazing flux of the present invention was prepared in the following manner. First, an aqueous slurry (about 60 wt %) was prepared from 0.75 mol of boehmite ($Al_2O_3 \cdot H_2O$) having a particle diameter smaller than 10 μm, 5.0 mol of CsF, 3.5 mol of $AlF_3 \cdot 3H_2O$, and water, by stirring at 80° C. for 2 hours. (Its composition is equivalent to being composed of 50 mol % of CsF, 35 mol % of $AlF_3$, and 15 mol % of $Al(OH)_3$.) The dry product of the slurry is not hygroscopic.

The thus obtained flux sample underwent differential thermal analysis (DTA) and X-ray diffractometry in the same manner as in Example 1. The resulting DTA curve indicates that the flux sample melts or begins to melt at temperatures in the range of 440° C. to 580° C. Also, the resulting X-ray diffraction pattern indicates that the flux sample contains a complex salt but does not contain free CsF.

The flux sample was tested for brazing performance in the following manner. First, a pipe joint made of JIS A7N01 alloy (containing about 1.2 wt % of magnesium) was fitted to a pipe made of JIS A1050 alloy, with a brazing filler metal of Al-Si alloy of JIS A4047 (2 mm in diameter) placed on the assembly. The flux in the form of aqueous slurry was applied to the joint and brazing filler metal by brushing. After drying, the assembly was heated in a furnace under a nitrogen stream at 605° C. for 2 minutes. A firm joint was formed, without any defect.

EXAMPLE 4

A sample (No. 11) of the brazing flux of the present invention was prepared in the following manner. First, a mixture was prepared from 1 mol of crystalline $Al(OH)_3$ bayerite, 5 mol of HF, 1 mol of $Cs_2CO_3$, and 1 liter of water. The mixture was dried to give a solid product (which is equivalent to $Cs_2AlF_5 \cdot H_2O$, m.w.=406). Then, 100 g of the solid product was thoroughly mixed with 16 g of crystalline $Al(OH)_3$ bayerite and 100 g of water. Thus there was obtained the brazing flux in the form of aqueous slurry. (Its composition is equivalent to being composed of 52 mol % of CsF, 26 mol % of $AlF_3$, and 22 mol % of $Al(OH)_3$.)

The flux sample was tested for brazing performance in the following manner. First, a pipe joint was fitted to a pipe, with a brazing filler metal (2 mm in diameter) placed on the assembly, in the same manner as in Example 3. The brazing filler metal is made of an Al-36Zn-6Si alloy, having a melting point of 470°-520° C. The aqueous slurry of flux was previously applied to the brazing filler metal. The face-fed brazing of the assembly was performed by heating with an oxygen-acetylene torch burner in the atmosphere. A firm joint was formed, without any defect. During brazing, the flux did not give off a large amount of fumes.

EXAMPLE 5

A sample (No. 12) of the brazing flux in paste form of the present invention was prepared in the following manner. 2.75 mol of $Cs_2CO_3$ and 4.5 mol of crystalline $Al(OH)_3$ gibbsite were mixed in an aqueous solution containing 13 mol of HF. Al, Cs and F were reacted with each other during stirring. (It is equivalent to being composed of 55 mol % of CsF, 25 mol % of $AlF_3$, and 20 mol % of $Al(OH)_3$.) In the same manner as above, seven more samples of the brazing flux were prepared, whose compositions are given below.

No. 13: CsF (58 mol %), $AlF_3$ (20 mol %), $Al(OH)_3$ (22 mol %)
No. 14: CsF (48 mol %), $AlF_3$ (30 mol %), $Al(OH)_3$ (22 mol %)
No. 15: CsF (48 mol %), $AlF_3$ (47 mol %), $Al(OH)_3$ (5 mol %)
No. 16: CsF (60 mol %), $AlF_3$ (25 mol %), $Al(OH)_3$ (15 mol %)
No. 17: CsF (55 mol %), $AlF_3$ (20 mol %), $Al(OH)_3$ (25 mol %)
No. 18: CsF (55 mol %), $AlF_3$ (41 mol %), $Al(OH)_3$ (4 mol %)
No. 19: CsF (47 mol %), $AlF_3$ (38 mol %), $Al(OH)_3$ (15 mol %)

The dry products of the flux samples (Nos. 12 to 19) underwent X-ray diffractometry. The resulting X-ray diffraction patterns indicate that they do not contain free CsF but contain a complex salt.

The flux samples (Nos. 12 to 19) were tested for brazing performance (ability to spread the brazing filler metal) in the same manner as in Example 2. A wire of brazing filler metal (JIS A4047) was placed on a piece of an aluminum alloy plate (measuring 2 by 3 cm and 1 mm thick) containing 1.7 wt % of magnesium (conforming to JIS A7N01) or containing 2.5 wt % of magnesium (conforming to JIS A5052).

For comparison, the same experiment as above (spreadability of brazing filler metal) was carried out using a comparative sample (No. C7), which is a CsF-$AlF_3$ binary flux composed of 55 mol % of CsF and 45 mol % of $AlF_3$.

The results are shown in Table 5. It is noted that the flux samples Nos. 5 to 7 and 9 to 15 (whose compositions are equivalent to being composed of 48-58 mol % of CsF, 20-47 mol % of $AlF_3$, and 5-22 mol % of $Al(OH)_3$) permitted the brazing filler metal to spread over an area larger than 1 cm², whereas the comparative flux sample (No. C7) permitted the brazing filler metal to spread only 0.1 cm² (on the material of JIS A7N01) or 0.0 cm² (on the material of JIS A5052). It is also noted that the flux samples Nos. 1 to 4, 8, and 16 to 19 permitted the brazing filler metal to spread over an area of 0.6 to 0.9 cm² (on the material of JIS A7N01) which is 6 to 9 times larger than that of the comparative flux or over an area of 0.2-0.3 cm² (on the material of JIS A5052 with a high magnesium content). The samples in the second group are slightly inferior to those in the first group. None of these samples gave off a large amount of fumes during the brazing test.

The results of differential thermal analysis indicate that the flux samples Nos. 12 to 19 melt at 440°-580° C., whereas the comparative flux sample (No. C7) melts at 440°-470° C.

It is concluded from the above-mentioned results that the fluxes in this example have a broader range of melting temperature than has the comparative CsF-$AlF_3$ binary flux. Therefore, they facilitate the brazing of aluminum materials with a high magnesium content. A particularly high flux activity is obtained with the flux samples composed of 48–58 mol % of CsF, 20–47 mol % of AlF3, and 5–22 mol % of Al(OH)3.

TABLE 5

| Sample No. | Composition (mol %) | | | Spreadability (area, cm²) | | Rating |
|---|---|---|---|---|---|---|
| | CsF | ALF3·3H2O | AL(OH)3 or ½AL2O3 | on A7N01 | on A5052 | |
| 1 | 42 | 14 | 44 | 0.6 | 0.2 | fair |
| 2 | 66 | 22 | 12 | 0.8 | 0.2 | fair |
| 3 | 66 | 32 | 2 | 0.8 | 0.2 | fair |
| 4 | 42 | 56 | 2 | 0.7 | 0.2 | fair |
| 5 | 55 | 25 | 20 | 2.0 | 1.8 | good |
| 6 | 55 | 40 | 5 | 1.2 | 1.1 | good |
| 7 | 50 | 35 | 15 | 1.6 | 1.6 | good |
| 8 | 45 | 20 | 35 | 0.8 | 0.3 | fair |
| 9 | 55 | 25 | 20 | 1.8 | 1.8 | good |
| 10 | 50 | 35 | 15 | 1.6 | 1.5 | good |
| 11 | 52 | 26 | 22 | 1.8 | 1.8 | good |
| 12 | 55 | 25 | 20 | 2.0 | 2.0 | good |
| 13 | 58 | 20 | 22 | 1.4 | 1.1 | good |
| 14 | 48 | 30 | 22 | 1.3 | 1.2 | good |
| 15 | 48 | 47 | 5 | 1.2 | 1.1 | good |
| 16 | 60 | 25 | 15 | 0.9 | 0.3 | fair |
| 17 | 55 | 20 | 25 | 0.9 | 0.3 | fair |
| 18 | 55 | 41 | 4 | 0.7 | 0.3 | fair |
| 19 | 47 | 38 | 15 | 0.8 | 0.3 | fair |
| C* | 55 | 45 | 0 | 0.1 | 0.0 | poor |

EXAMPLE 6

A sample (No. 20) of the brazing flux of the present invention was prepared in the following manner. First, a mixture was prepared from CsF, AlF3·3H2O, and crystalline Al(OH)3 bayerite, in a molar ratio of 55:40:5, and water. After stirring at 80° C. for 2 hours, the mixture was dried and solidified at 100° C. and crushed into powder. Thus there was obtained a powder flux whose composition is equivalent to being composed of 55 mol % of CsF, 40 mol % of AlF3, and 5 mol % of Al(OH)3.

The flux sample was tested for brazing performance in the following manner. First, a cast rectangular prism of aluminum alloy (AC2B) was fitted to a pipe (JIS A6063), with a ring of brazing filler metal placed on the joint. The brazing filler metal is an Al-85Zn alloy, which begins to melt at 382° C. A proper amount of the flux was applied to the joint for brazing. To carry out brazing, the assembly was heated at 500° C. in nitrogen for 30 minutes. A firm joint was formed between the aluminum alloy casting and the pipe, without any defect.

EXAMPLE 7

A sample (No. 21) of the brazing flux in slurry form was prepared in the following manner. 2.75 mol of Cs2CO3 and 4.5 mol of crystalline Al(OH)3 bayerite were mixed in an aqueous solution containing 14.2 mol of HF. Al, Cs and F were reacted with each other during stirring. (The composition of this flux is equivalent to being composed of 55 mol % of CsF, 29 mol % of AlF3, and 16 mol % of Al(OH)3.) After drying, the solid flux underwent X-ray diffractometry. The resulting X-ray diffraction pattern indicates that the flux sample contains a complex salt but does not contain free CsF.

The flux sample was tested for brazing performance (ability to spread the brazing filler metal) in the following manner. First, a pipe joint was fitted to a pipe on a jig. The pipe joint is made of JIS A7N01 alloy containing 1.7 wt % of magnesium. The pipe is made of JIS A1050 alloy. A wire of brazing filler metal conforming to JIS A4047 and the flux in the form of aqueous slurry were supplied to the joint by automatic feeders. The automatic face-fed brazing of the assembly was performed by heating with oxygen-acetylene torch burner in the atmosphere. A firm joint was formed, with the brazing filler metal completely spread.

For comparison, brazing was performed in the same manner as above with a ternary flux composed of 22 mol % of CsF, 32 mol % of KF, and 46 mol % of AlF3. It was impossible to obtain a good joint due to incomplete spreading of the brazing filler metal.

What is claimed is:

1. A brazing flux suitable for brazing aluminum materials with a high magnesium content, comprising cesium fluoride, aluminum fluoride, and at least one material selected from the group consisting of crystalline aluminum hydroxide and crystalline aluminum oxide, said brazing flux being a crystalline compound having the following composition and containing cesium in the form of a complex salt:

$$x \cdot CsF - y \cdot AlF_3 - \tfrac{1}{2} z \cdot [Al_2O_3 \cdot nH_2O \text{ and/or } Al_2O_3]$$

where $x+y+z=100$, $x/y \leq 3$, $42 \leq x \leq 66$, and $z \geq 2$ in terms of mol %.

2. A brazing flux as claimed in claim 1, wherein said crystalline compound comprises a complex compound composed of cesium (Cs), aluminum (Al), and fluorine (F), with cesium being in the form of a complex salt, or a mixture of said complex compound and aluminum fluoride (AlF3), and at least one of said crystalline aluminum hydroxide (Al2O3·nH2O) and said crystalline aluminum oxide (Al2O3).

3. A brazing flux as claimed in claim 2, wherein said complex compound is cesium fluoroaluminate or cesium fluoroaluminate with fluorine atoms thereof partly replaced by OH groups.

4. A brazing flux as claimed in claim 3, wherein said cesium fluoroaluminate is at least one member selected from the group consisting of cesium hexafluoroaluminate (Cs3AlF6), cesium tetrafluoroaluminate (CsAlF4·2H2O), and cesium pentafluoroaluminate (Cs2AlF5·H2O).

5. A brazing flux as claimed in claim 3, wherein said cesium fluoroaluminate with fluorine atoms thereof partly replaced by OH groups is a compound represented by $Cs_xAl_y(F, OH)_z \cdot nH_2O$ where x, y, z, and n are integers and $x+3y=z$.

6. A brazing flux as claimed in claim 2, wherein said crystalline aluminum hydroxide is hydrated aluminum oxide or water-containing aluminum oxide represented by $Al_2O_3 \cdot nH_2O$.

7. A brazing flux as claimed in claim 6, wherein said crystalline aluminum hydroxide is at least one member selected from the group consisting of boehmite, diaspore, gibbsite, and bayerite.

8. A brazing flux as claimed in claim 2, wherein said crystalline aluminum oxide is at least one member selected from activated alumina such as $\gamma$-alumina and $\alpha$-alumina.

9. A brazing flux as claimed in claim 2, wherein said aluminum hydroxide or aluminum oxide is a powder having a particle diameter smaller than 10 $\mu$m.

10. A brazing flux as claimed in claim 1, wherein said crystalline compound has a melting point in the range of from 440° C. to 580° C.

11. A brazing flux as claimed in claim 2, wherein said brazing flux comprises 5–22 mol % of crystalline Al-$(OH)_3$, 48–50 mol % of CsF, and 20–47 mol % of $AlF_3$.

12. A process for producing a brazing flux suitable for brazing aluminum materials with a high magnesium content, comprising
preparing a mixture of hydrofluoric acid, cesium salt, and at least one selected from the group consisting of crystalline aluminum hydroxide and crystalline aluminum oxide, and
causing reaction of said mixture to form a crystalline compound which has the following composition and contains cesium in the form of a complex salt:

$$x \cdot CsF - y \cdot AlF_3 - \tfrac{1}{2} \cdot z \cdot [Al_2O_3 \cdot nH_2O \text{ and/or } Al_2O_3]$$

where $x+y+z=100$, $x/y \leq 3$, $42 \leq x \leq 66$, and $z \geq 2$ in terms of mol %.

13. A process for brazing aluminum materials with a high magnesium content, comprising
preparing a flux comprising a crystalline compound which has the following composition and contains cesium in the form of a complex salt:

$$x \cdot CsF - y \cdot AlF_3 - \tfrac{1}{2} \cdot z \cdot [Al_2O_3 \cdot nH_2O \text{ and/or } Al_2O_3]$$

where $x+y+z=100$, $x/y \leq 3$, $42 \leq x \leq 66$, and $z \geq 2$ in terms of mol %,
preparing brazing material comprising at least one member selected from the group consisting of Al-Si alloy, Al-Si-Cu alloy, Al-Si-Cu-Zn alloy, Al-Zn-Si alloy, and Al-Zn alloy, and
applying said flux and said brazing material to a joint of aluminum materials, and heating the joint at a temperature higher than the melting point of said brazing material,
thereby joining said aluminum materials.

14. A brazing process as claimed in claim 13, wherein heating is performed by means of a torch burner fueled with oxygen-acetylene, town gas, or propane.

15. A brazing process as claimed in claim 13, wherein heating is performed in an atmosphere or a non-oxidizing gas.

* * * * *